(12) United States Patent
Gyori et al.

(10) Patent No.: US 10,967,790 B2
(45) Date of Patent: Apr. 6, 2021

(54) IMAGE SYNTHESIZER FOR A SURROUND MONITORING SYSTEM

(71) Applicant: KNORR-BREMSE SYSTEME FUER NUTZFAHRZEUGE GMBH, Munich (DE)

(72) Inventors: Marton Gyori, Budapest (HU); Huba Nemeth, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 15/755,995

(22) PCT Filed: Sep. 6, 2016

(86) PCT No.: PCT/EP2016/070899
§ 371 (c)(1),
(2) Date: Feb. 27, 2018

(87) PCT Pub. No.: WO2017/042137
PCT Pub. Date: Mar. 16, 2017

(65) Prior Publication Data
US 2018/0244199 A1 Aug. 30, 2018

(30) Foreign Application Priority Data

Sep. 10, 2015 (EP) .................................. 15184705

(51) Int. Cl.
*B60R 1/00* (2006.01)
*G06T 3/40* (2006.01)
(Continued)

(52) U.S. Cl.
CPC .............. *B60R 1/00* (2013.01); *G06T 3/4038* (2013.01); *G06T 11/60* (2013.01); *H04N 7/181* (2013.01);
(Continued)

(58) Field of Classification Search
CPC .............. B60R 1/00; B60R 2300/8093; B60R 2300/305; B60R 2300/105;
(Continued)

(56) References Cited

U.S. PATENT DOCUMENTS

| 7,139,412 B2 | 11/2006 | Kato et al. |
| 2011/0285848 A1 | 11/2011 | Han et al. |
| 2012/0121136 A1 | 5/2012 | Gloger et al. |
| 2012/0293610 A1* | 11/2012 | Doepke .............. H04N 5/23238 348/36 |

(Continued)

FOREIGN PATENT DOCUMENTS

| CN | 1984323 A | 6/2007 |
| CN | 101621634 A | 1/2010 |

(Continued)

OTHER PUBLICATIONS

International Search Report dated Nov. 22, 2016, of the corresponding International Application PCT/EP2016/070899 filed Sep. 6, 2016.

*Primary Examiner* — Farhan Mahmud
(74) *Attorney, Agent, or Firm* — Norton Rose Fulbright US LLP; Gerard Messina

(57) ABSTRACT

An image synthesizer for a surround monitoring system for a vehicle includes a receiving module for receiving a first image from a first camera, a second image from a second camera, and a control signal from a control module; and a combining module for combining the first image and the second image in the overlapping region and, depending on the control signal, to generate a combined image, the control signal indicating a condition external to the vehicle.

13 Claims, 7 Drawing Sheets

(51) Int. Cl.
*G06T 11/60* (2006.01)
*H04N 7/18* (2006.01)

(52) U.S. Cl.
CPC ... *B60R 2300/105* (2013.01); *B60R 2300/301* (2013.01); *B60R 2300/303* (2013.01); *B60R 2300/304* (2013.01)

(58) Field of Classification Search
CPC ........ B60R 2300/303; B60R 2300/607; B60R 2300/802; H04N 5/2628; H04N 13/243; H04N 5/23238; H04N 7/181; H04N 5/23293; G06T 2207/20221; G06T 3/4038; G06T 2207/30252; G06T 15/205; G06K 9/00791; G06K 9/00805; G08G 1/166

See application file for complete search history.

(56) References Cited

U.S. PATENT DOCUMENTS

| | | |
|---|---|---|
| 2013/0162830 A1 | 6/2013 | Mitsuta et al. |
| 2016/0086033 A1* | 3/2016 | Molin ................ G06K 9/00671 345/419 |
| 2016/0165148 A1 | 6/2016 | Itoh et al. |

FOREIGN PATENT DOCUMENTS

| | | |
|---|---|---|
| CN | 102629372 A | 8/2012 |
| CN | 102829763 A | 12/2012 |
| CN | 104282010 A | 1/2015 |
| EP | 1775952 A2 | 4/2007 |
| JP | 5124672 | 1/2013 |
| WO | 2015/004907 A1 | 1/2015 |

* cited by examiner

IMAGE SYNTHESIZER FOR A SURROUND MONITORING SYSTEM

FIELD OF THE INVENTION

The present invention relates to an image synthesizer and a method for synthesizing an image and, in particular, to an image synthesizer for a surround monitoring system in a vehicle based on a condition external to the vehicle or on feedback information.

BACKGROUND INFORMATION

Surround view systems for passenger cars showing the vehicle from a bird's eye view are available from several manufacturers. A few solutions are also available for commercial vehicles using multiple cameras to cover various sides of the vehicle. These multiple cameras produce two generally different images of the scene in an overlapping area, but the two separate images, e.g. of a single object, may confuse the driver. Thus, both images should be combined (synthesized) in the overlap area to obtain a combined image in a way that does not confuse the driver.

Available systems for commercial vehicles are based, for example, on concepts developed for passenger cars without adapting these systems to the particular needs of commercial vehicles.

There are several advantageous aspects in the environment of commercial vehicles that are not yet utilized in surround view systems.

In addition, conventional synthesizing devices as, for example, a surround view display, a mirror view display, or other displays blending together two camera images with different perspectives stitch together images statically.

By blending multiple images from different cameras around the vehicle in overlapping areas it becomes possible to create a seamless bird's eye view in these systems. However, a common issue with these surround view systems relates to the object visibility that is reduced in the stitching area. As a consequence of the blending, three-dimensional (3D) objects may disappear because the view of the 3D objects might be projected to the area blended-out from both views.

One prior art system is discussed in U.S. Pat. No. 7,139,412 B2, wherein several camera views are synthesized into a bird's eye view in a static way. On the other hand, a dynamic surround view generation based on vehicle speed is discussed in JP 5124672 B2 or US 2013/162830 A1. According to these systems, when the work vehicle is in a stopped state, a first virtual projection plane is used to create the bird's eye view image, wherein an outer edge portion has an increasing height from a ground surface as a distance from the work vehicle increases. On the other hand, when the work vehicle is in a traveling state, a second virtual projection plane is used with an outer edge portion having a uniformly flat shape in height from the ground surface.

A general issue of these and other image synthesizing applications relates to the following situation. When an object crosses the area where two images are combined (i.e. crossing a stitching line or the blending area), the object visibility may reduce or only part of the object is visible. In the worst situation, the object can disappear completely in this area.

Therefore, there is a demand for an image synthesizer, which overcomes the this problems and generates a combined image that provides an improved visibility of objects in a surveillance area.

SUMMARY OF THE INVENTION

The present invention solves this problem by providing an image synthesizer according to the description herein, a surround monitoring system according to the description herein, a vehicle according to the description herein and a method for synthesizing an image according to the description herein. The dependent claims refer to specifically advantageous realizations of the subject matters of the descriptions herein.

The present invention relates to an image synthesizer as used in driver assistant systems or in a surround monitoring systems for a vehicle. The surround monitoring system or an other driver assistant system comprises a first camera, a second camera, and a control module, wherein the first camera is configured to capture a first image from a first scene, the second camera is configured to capture a second image from a second scene, the control module is configured to generate a control signal indicating one or more conditions external to the vehicle or any feedback information. The first scene and the second scene partly overlap in an overlapping region of a surveillance area of the vehicle. The image synthesizer comprises a receiving module for receiving the first image, the second image, and the control signal; and a combining module for combining the first image and the second image in the overlapping region and, dependent on the control signal, to generate a combined image.

The above-mentioned problem is solved by the claimed subject matter in that the images are synthesized dynamically dependent on the position of one or more 3D object(s). As a result, the image synthesizer provides a best view of the 3D object(s) eliminating stitching line(s) crossing any of those objects.

The vehicle may be subject to various external conditions that may be part of the feedback condition. These conditions include, for example, weather conditions (rain, snow, falling leaves, etc.), condition of the surface of the ground (wet, dry, icy, etc.), light conditions (day, night, etc.), objects or obstacles around the vehicle, but also the speed, the position or orientation (uphill or downhill) of the vehicle, or any other feedback information.

Therefore, according to yet another embodiment, the condition(s) external to the vehicle includes at least one of the following: a driving condition, an environmental condition of the vehicle, and further input. All these conditions may be taken into account in the control signal to provide the driver a surround view, which comes as close as possible to the actual situation around the vehicle and does not cause confusion to the driver. Corresponding sensors sensing these various conditions may generate sensor signals forwarded to a control module. It may also be possible to derive these conditions from the images captured by the cameras. The further details of how to derive the corresponding data are not important for the present invention.

One example of the external condition relates to the presence of an object in the overlapping region, in which case the control signal may indicate a position of the object in the overlapping region and, according to another embodiment, the combining module may be configured to combine the first image and the second image by stitching the first image and the second image along a stitching line in an area of the overlapping region without crossing the position of the object. The position of the object may be defined as the area covered by the object in the projective planes of the camera(s) capturing the image(s). Hence, the position is not a unique quantity and may depend on the camera that captures an image of the object.

According to yet another embodiment, the combining module may be configured to combine the first image and the second image by blending the first image and the second image in a blending area being part of the overlapping region such that the position of the object is outside blending area. For example, the combining module may combine the first image and the second image by blending the first image and the second image perpendicular to the stitching line. The blending region may be inside the overlapping region, i.e. the combined image in the overlapping region comprises image data of the first as well as of the second image.

According to yet another embodiment, the combining module may be configured to determine a middle line of the overlapping region and place to stitching line at the middle line (or to place the blending region to include the middle line).

According to yet another embodiment, the combining module may be configured to perform the blending as a gradient blending or/and as a binary blending. The blending may be performed using a blending mask, wherein the blending mask implements a gradient blending or a binary blending.

According to yet another embodiment, the combining module may be configured to perform or to select the blending dependent on the condition external to the vehicle. For example, the blending width, the granularity of the binary blending, etc. may depend on one or more the external conditions or feedback information. The selection may be done to improve the visibility of the object, e.g. by selecting the granularity of the binary blending.

According to yet another embodiment, the receiving module may be configured to receive an error signal as feedback information indicating a malfunction of the first camera or of the second camera, and the combining module may be configured to generate the combined image by ignoring image data of the malfunctioned camera.

According to yet another embodiment, the object is one of a plurality of objects in the overlapping region, and the combining module may be configured to place the stitching line at a distant object, wherein the distant object is further away from the vehicle than other objects from the plurality of objects. As defined previously, objects are typically 3D objects (and not markings on the ground) and the distance to the object(s) may be defined as the closest connection to the vehicle or to the respective camera. The stitching line is in general a straight line, but it may also be curved.

According to yet another embodiment, the combining module is configured to perform a perspective transformation (e.g. a bird's eye view) of the first and/or the second image before combining the first and second images, or to perform a perspective transformation of the combined image, and to provide it for display to a driver of the vehicle.

The present invention relates also to a surround monitoring system for monitoring a surveillance area of or around the vehicle that comprises at least a first camera and a second camera; a control module being configured to generate a control signal indicating the condition external to the vehicle; and an image synthesizer as described before.

According to yet another embodiment, four cameras are available for capturing four images, wherein the four cameras are attachable at four corners of the vehicle so that each part of the surveillance area is covered by two images of the four images. The control module may be configured to issue an error signal as feedback information in case of a malfunction of one of the four cameras and the combining module is configured to generate a combined image by ignoring image data of the malfunctioned camera and to use in the corresponding overlapping region only image data of camera(s) adjacent to the one malfunctioned camera.

For example, a special camera placement for commercial vehicles may allow to cover two vehicle sides with one camera and, when four cameras are placed on a vehicle, the loss of one camera can be substituted by the other three cameras to provide still a view of the complete surroundings of the vehicle.

The control module may receive sensor data indicative of a driving condition and/or an environmental condition of the vehicle and/or further input data (e.g. the error signal) and to include the received data in the control signal to control the combining module. In addition, the position of the object can be taken as information derived from any sensing arrangement.

However, the use of the image synthesizer in a surround monitoring system is only one example. Additional embodiments cover more than the surround view system and may be extended to any device that may assist the driver (e.g. a mirror view display, or other displays) using image synthesizing.

The present invention relates also to a vehicle with the described driver assistant system or the surround monitoring system for monitoring a surveillance area of the vehicle.

The present invention relates also to a method for synthesizing an image for the surround monitoring system or the driver assistant system for the vehicle. The method comprises the step of receiving the first image, the second image, and the control signal indicative of an external condition or feedback information; combining the first image and the second image in the overlapping region; and generating a combined image dependent on the control signal.

This method may also be implemented in software or a computer program product. Thus, the present invention relates also to a computer program product having a program code stored thereon, which performs the above-mentioned method, when the computer program is executed on a computer or processor.

In addition, all functions described previously in conjunction with the image synthesizer can be realized as further method steps and be implemented in software or software modules. Furthermore, the order of steps is not important to achieve the desired effect.

Therefore, when compared to conventional surround view systems, embodiments of the present invention do not rely on static blending procedures to synthesize a bird's eye view image. Embodiments distinguish from the aforementioned conventional systems in particular by the following features:

The portion of the overlapping area for stitching the bird's eye view is dynamically selected in order to provide the best view of surrounding objects.

The area covered by a camera view is dynamically extended to its field of view, when the view of other cameras that overlap is lost.

Embodiments provide the advantage that the stitching area, where the two images are combined, is an area that does not cross an object—the stitching area is moved or modified, dependent on the position of the object. In this way, the visibility of the object is not affected and the object remains visible, even if the object moves through the stitching area. This dynamic adjustment overcomes the problems of the conventional systems.

Various embodiments of the present invention will be described in the following by way of examples only, and with respect to the accompanying drawings.

DETAILED DESCRIPTION

Figure 1:
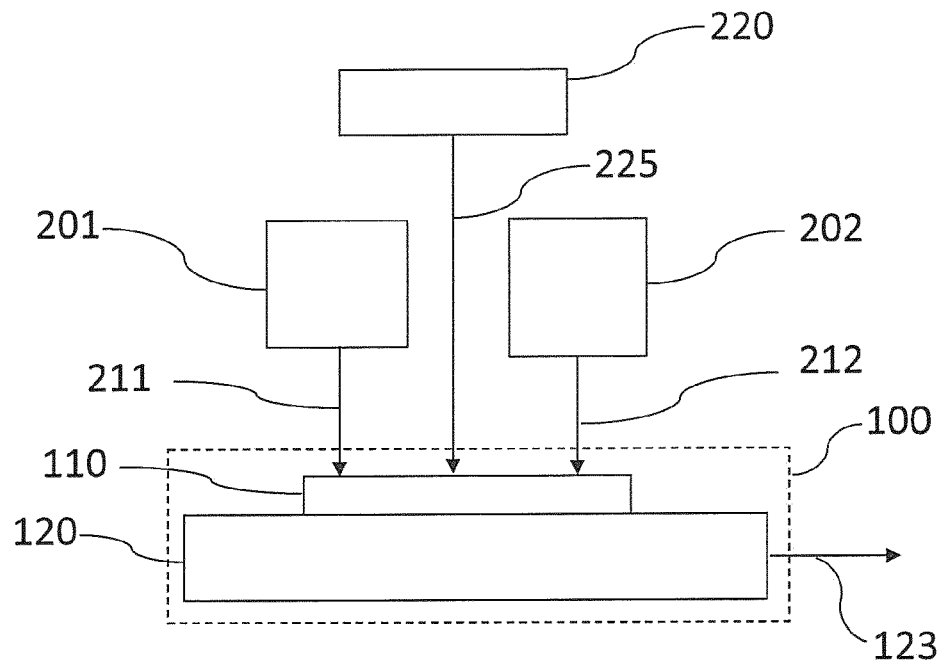
FIG. 1 shows an image synthesizer according to an embodiment of the present invention.

FIG. 1 depicts an image synthesizer for a surround monitoring system or for any other display device of/for a vehicle. The surround monitoring system comprises a first camera 201, a second camera 202, and a control module 220. The first camera 201 is configured to capture a first image 211 from a first scene, the second camera 202 is configured to capture a second image 212 from a second scene. The control module 220 is configured to generate a control signal 225 indicating one or more condition(s) external to the vehicle or feedback information, wherein the first scene and the second scene partly overlap in an overlapping region of a surveillance area of the vehicle.

The image synthesizer comprises a receiving module 110 for receiving the first image 211, the second image 212, and the control signal 225. The image synthesizer further comprises a combining module 120 for combining the first image 211 and the second image 212 in the overlapping region 213 and, dependent on the control signal 225, to generate a combined image 123.

The present invention is based on the idea that the stitching line can be moved freely in the overlapping area of the two camera views so that the resulting dynamic image-synthesizing system does not combine static camera views, but dynamically updates or adjusts the combined image 123 based on the circumstances (for example, positions or movements of objects). The main benefits of such systems rely on an optimized view of the objects around the vehicle providing a better visibility of the object(s).

In particular, according to the present invention, the stitching line is moved to an area where no 3D object is present. On the other hand, two-dimensional (2D) objects may still be present, because they typically do not result in the above-mentioned doubling of objects. However, potholes in the road may also be objects that are taken into account when placing or moving the stitching line.

Figure 2:
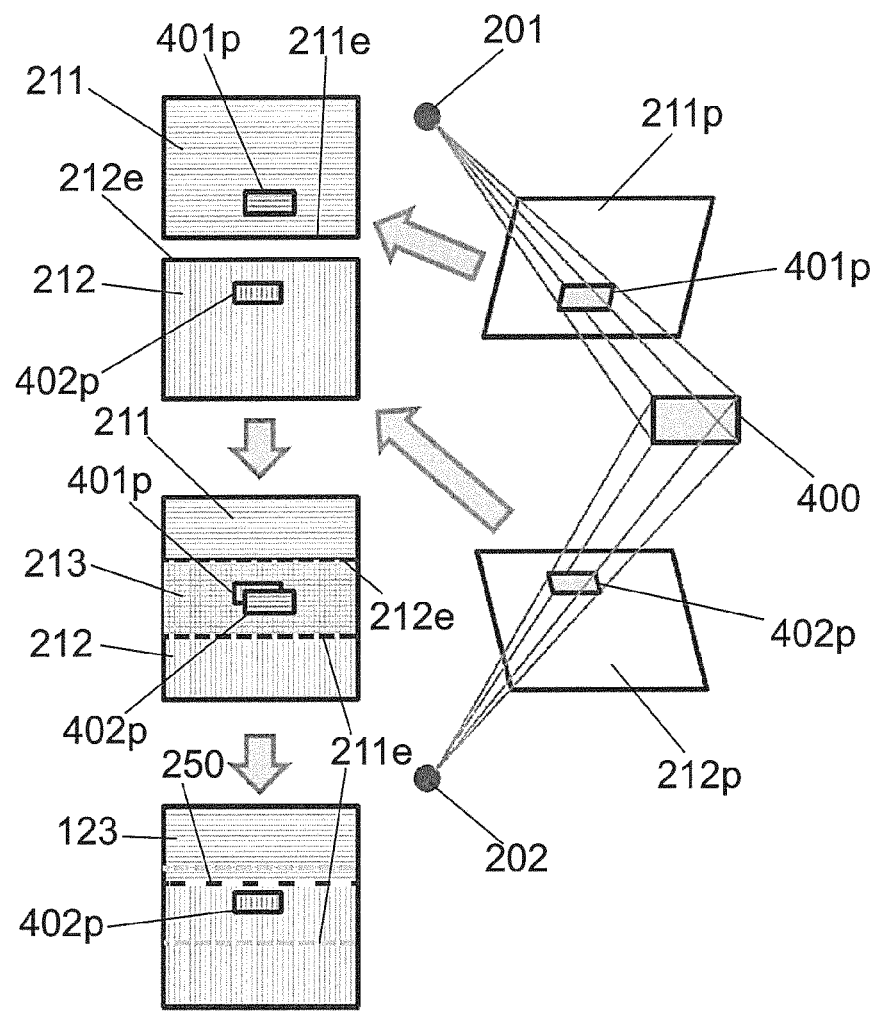
FIG. 2 shows an embodiment for the stitching of two camera views.

FIG. 2 depicts an embodiment for the stitching of two camera views, illustrating further details of placing a stitching line 250 in accordance with the present invention.

In detail, FIG. 2 shows a first camera 201 capturing a first image 211 in a first image plane 211p and a second camera 202 capturing a second image 212 in a second image plane 212p. Both cameras 201, 202 take images from an object 400, wherein the object 400 in the first image plane 211p appears as a first projection 401p and in the second image plane 212p as a second projection 402p. Although it is the same object 400, the projections may look different.

On the left-hand side, FIG. 2 illustrates the process of combining the first image 211 captured by the first camera 201 and the second image 212 captured by the second camera 202. The first image 211 comprises a lower edge 211e and the second image 212 comprises an upper edge 212e. When combining the first image 211 and the second image 212 the first image 211 and the second image 212 are first overlaid in an overlapping region 213, which is bounded by the lower edge 211e of the first image 211 and the upper edge 212e of the second image 212. As a result, the combined image comprises an upper portion (above the upper edge 212e), which contains only image data of the first image 211, a lower portion (below the lower edge 211e), which contains only image data of the second image 212, and the overlapping region 213, wherein image data of both images are added. As a result, the object 400 appears twice, as the first projection 401p and as the second projection 402p.

This situation may confuse the driver. Therefore, according to embodiments of the present invention, when generating a combined image 123, a stitching line 250 is placed at a position where none of the projections 401p, 402p of the object 400 is visible. As shown in FIG. 2, the stitching line 250 may be placed above the first and second projections 401p, 402p. In the simplest case, the process of stitching generates a combined image 123 that comprises above the stitching line 250 image data only of the first image 211 and below the stitching line 250 image data only of the second image 212. Thus, the first projection 401p may be eliminated in the combined image 123 and only the second projection 402p remains visible as a single object.

Of course, the stitching line 250 can also be placed below the projections of the object 400 so that only the first projection 401p would be visible in the combined image 123. According to the present invention, the stitching line 250 can be placed at any position, where no object is visible while cutting off one of the projection of the object, either in the first image 211 or in the second image 212.

In further embodiments, perpendicular to the stitching line 250 (in a vertical direction in FIG. 2) a blending procedure can be applied such that the stitching line 250 does not appear as an abrupt or sudden transition from one image to the other, but the first image 211 is blended smoothly over to the second image 212 in the corresponding blending region.

The blending of the two images can be carried out pixel-wise for each pixel of the blending area. For example, when the blending area defines a strip with a width, each pixel value P along the width direction can be represented by the following equation:

$$P = \alpha * I_1 + (1-\alpha) * I_2 = I_2 + \alpha * (I_1 - I_2), \quad (1)$$

wherein for a given pixel $I_1$ represents the image data of a respected pixel of an image 1 and $I_2$ corresponds to the image data of an image 2 (e.g. the first and the second image 211, 212) so that P is the resulting pixel value of the combined image 123 (depicted in the overlapping region 213). In addition, the parameter $\alpha$ is the interpolation parameter, which interpolates the image data by running from 0 (image 2) to 1 (image 1) along the interpolation direction from the first image 211 to the second image 212 (or vice versa).

Therefore, when applying the blending procedure to the overlapping area 213 or part thereof, the parameter $\alpha$ is a function dependent, for example, on a coordinate of the width direction such that the function $\alpha$ becomes 0 (or close to 0) on one side of the blending area and becomes 1 (or close to 1) on the other side of the blending area. Therefore, the parameter α parameterizes the percentage or proportion of the first and second images 211, 212 for a given pixel in the blending area.

A gradient blending refers to the case, where the parameter α is a smooth function such that the pixel values of the first image 211 and the second image 212 are added up with a weight defined by α (parameterizes the contribution proportional to the difference $I_1-I_2$). This defines, however, only one possible blending. According to further embodiments, the parameter α may also parameterize a binary blending, in which case the parameter α is binary function and can only take two values: 0 or 1 (or close to these values). For this blending each pixel in the blending area depicts either image 1 or image 2 (i.e. the respective image data). In this case, the interpolation from one image to the other image is achieved by varying the density of pixels showing image 1 within a plurality of pixels showing image 2.

The corresponding binary mask may also be modified or adapted to particular situations defined by the external condition/feedback information. The modification may involve a change in the size of portions, i.e. the number of pixels belonging to one portion of a binary mask (granularity). Furthermore, the density of the first image depicted inside the second image may be changed (by changing the proportion of the first relative to the second portions). It may further be reasonable to increase the proportion of the first image 211 relative to the second image 212, if the first scene (i.e. the first image) is dark whereas the second scene is bright. This would improve the visibility. In addition, the size of the overlapping region to which the binary masking is applied may be modified. Therefore, in yet another embodiment, the image synthesizer comprises a mask modification module that is configured to modify the binary mask dependent on at least one of the following parameters: a driving condition, an environmental condition of the vehicle, and/or further input.

Of course, the described interpolation represents only one example. A person skilled in the art can readily set up further interpolations.

The width of the blending region can be selected freely. Since the stitching line 250 may be moved to any position, where no object is visible in the camera images 211, 212, a narrow blending (or even no blending) may be used in the remaining portion of the combined image 123 while still ensuring good visibility of objects.

In conventional systems, narrow blendings are often avoided, because objects may suddenly disappear or emerge which is confusing for the driver. However, the width of the blending region may be adjusted such that the blending region covers only regions in the images, where no object is visible and thus no object can disappear. Hence, not only the stitching line 250 may be moved away from the object, but also the whole blending region may be spaced from the object 400. In FIG. 2 for example, the blending may be restricted to the region between the upper edge 212e of the second image 212 and the locations of the first and second projections 401p 402p. Consequently, the first projection 401p cannot be re-introduced by performing the blending.

Since according to the present invention, a narrow blending can be used without the detrimental effect of the conventional systems, a wide range of placing the stitching line 250 is available without increasing the size of the overlapping area 213—the element that is moved inside the available room (the blending region) gets smaller in this way, i.e. by using a narrow blending.

If in the blending area of the combined image 123 a gradient transition from one view to the other view is performed, the stitching line can be defined as the middle line comprising 50% of one image and 50% of the other image. Although a transition from one image to the other image may be visible as a recognizable line (if no blending is performed), this may still be acceptable, because no object is present in this region. On the other hand, when the blending area would be wide, the transition would be smooth, but the positions of the objects may not be avoided anymore so that the objects may seen doubled. According to the present invention both effects are compromised.

However, several objects may be present and the overlapping area of two cameras may not have a region without any object, where one may like to place the stitching line 250. In such situations the stitching line 250 may be moved to an area where the distance from the vehicle to the 3D object is the largest. The stitching line 250 may also be placed near those objects, which are less critical (e.g. for which a collision is unlikely).

Figure 3:
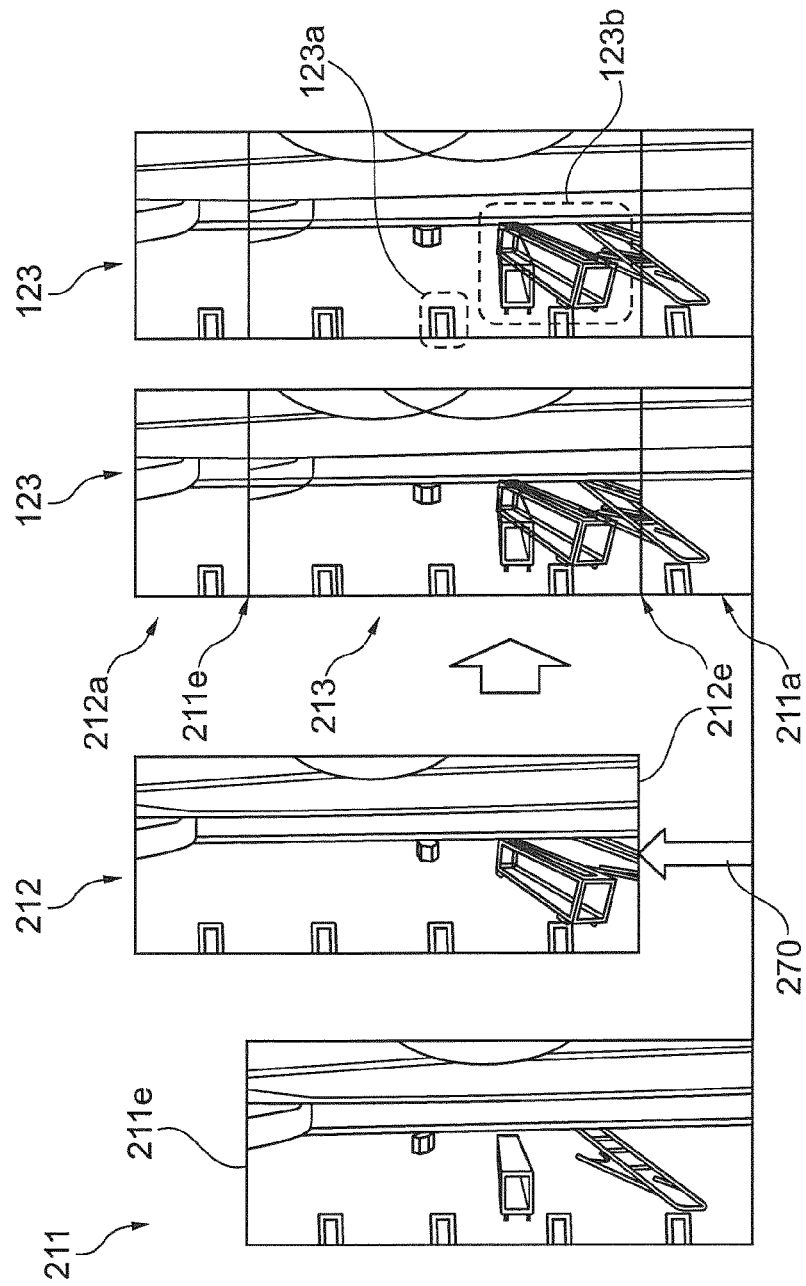
FIG. 3 shows objects seen from two cameras in a combined image.

FIG. 3 depicts the first image 211 and the second image 212, where the whole overlapping area is used for a 50%-50% blending area (i.e. α=½ in eq. (1) and no gradients) to illustrate the advantages of the present invention. The second image 212 has an offset 270 relative to the first image 211, because the respective second camera 202 capturing the second image 212 is located at a different position at the vehicle. For example, the positions of the first camera 201 taking the first image 211 may be spaced from the second camera 212 by a distance (the offset 270) in the range of 1 to 10 m or about 2.5 m.

FIG. 3 further shows that the first image 211 and the second image 212 are combined to a combined image 123, which comprises the overlapping region 213, where both images 211, 212 are combined with each other. In addition, the combined image 123 comprises a upper portion 212a with image data only of the second image 212, but no image data from the first image 211, and a lower portion 211a with image data of the first image 211, but with no image data from the second image 212. The first image 211 comprises an upper edge 211e defining an upper limit of the overlapping region 213 and the second image 212 comprises a lower edge 212e defining a lower limit of the overlapping region 213 (up to this line the second image 211 extends).

Therefore, the overlapping region 213 extends between the lower edge 212e and the upper edge 211e and is generated by adding image data of the first and the second image 211, 212, each contributing 50% in the overlapping region 213.

In the depicted case, a perspective transformation was also applied to the first and second images 211, 212 and the images were projected to the ground. On the two images (the first image 211 and the second image 212) flat, 2D objects like the markings on the ground in a first region 123a (see on the right-hand side for the combined image 123) look the same in the two flattened camera views. On the other hand, 3D objects in a second region 123b look differently, because due to their height the different view angles result in different projections for both cameras (the objects are projected in different directions). As a result, when the two flattened views are combined with each other into the combined image 123, a single object is visible twice as shown n the second region 123b (i.e. it is doubled or ghost-like).

The driver cannot immediately distinguish the actual objects and cannot decide how many objects are present in the surveillance area. The present invention overcomes this deficiency by placing a stitching line appropriately as described in FIG. 2. An optional blending may further improve the visibility without re-introducing any ghost-type objects.

Figure 4:
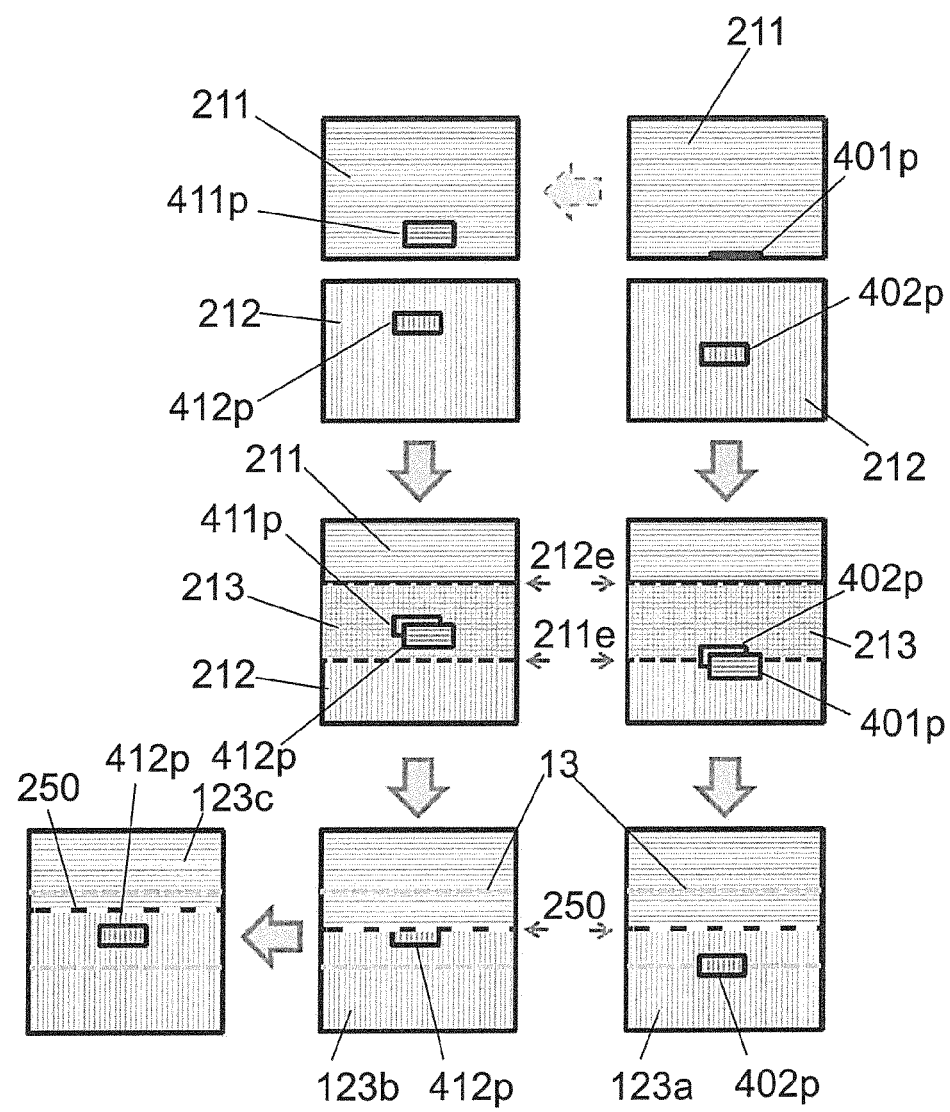
FIG. 4 shows a dynamical stitching for synthesized camera views.

FIG. 4 depicts a situation, where the object 400 is moving relative to the vehicle (the vehicle may also move). To avoid a disappearance of the projections of the object 400, the stitching line 250 needs to be moved in the resulting combined image 123.

On the right hand side (right column), the initial situation is shown. The first image 211 shows only a part of the first projection 401p of the object 400, whereas the second image 212 shows the complete second projection 402p of the object 400. When following the procedure as described before, the first image 211 and the second image 212 are combined, wherein in a first step both images are added in the overlapping region 213 so that the first projection 401p and the second projection 402p are located at a position of the lower edge 211e of the first image 211. Hence, if the stitching line 250 is placed in the middle of the overlapping region 213, the first projection 401p is cut out of the image and the second projection 402p remains visible on the resulting first combined image 123a.

In the middle column, FIG. 4 depicts the situation when the object 400 has been moved in a vertical direction such that the first image 211 comprises the moved (complete) first projection 411p and the second image 211 comprises the moved second projection 412p. In this example, the object 400 has moved vertically upwardly, i.e. closer to the stitching line 250 as it was depicted in the combined image 123a on the lower right side of FIG. 4. As a result of this movement, the first projection 411p and the second projection 412p get closer to the middle line of the overlapping region 213. If the stitching line 250 would now be placed in the middle as shown in the second combined image 123b, only half of the second projection 212p would remain visible. This, however, would confuse the driver. Therefore, in order to avoid this situation, according to the present invention, the stitching line 250 is moved away from the object, for example vertically upward, as it is shown in the third combined image 123c on the left-hand side. Therefore, this placement of the stitching line 250 cuts out the first projection 411p, but keeps the second projection 412p as a complete object and not as a cut object as is shown in FIG. 123b.

Therefore, independently of whether the object is moving or not moving, the stitching line 250 may be placed, as a default position, in the middle of the overlapping region 213 and, if this would result in a disappearance or partial disappearance of the object 400, the stitching line 250 is moved so that only one projection of the object 400 remains visible, i.e. the stitching line 250 is either moved towards the first image 211 or towards the second image 212 in the overlapping area 213.

The described dynamical generation of a combined image can also be used to replace one camera view by another camera view in the overlapping region 213 (e.g. when a camera exhibits a malfunction due to dirt, failure or other circumstances). To achieve this purpose, the surround view system may comprise multiple cameras mounted at corners of the vehicle so that each camera view covers two sides of the vehicle and thus the overlapping areas 213 are large enough to completely replace one camera by views of two adjacent cameras, while still covering the desired surveillance area.

Figure 5:
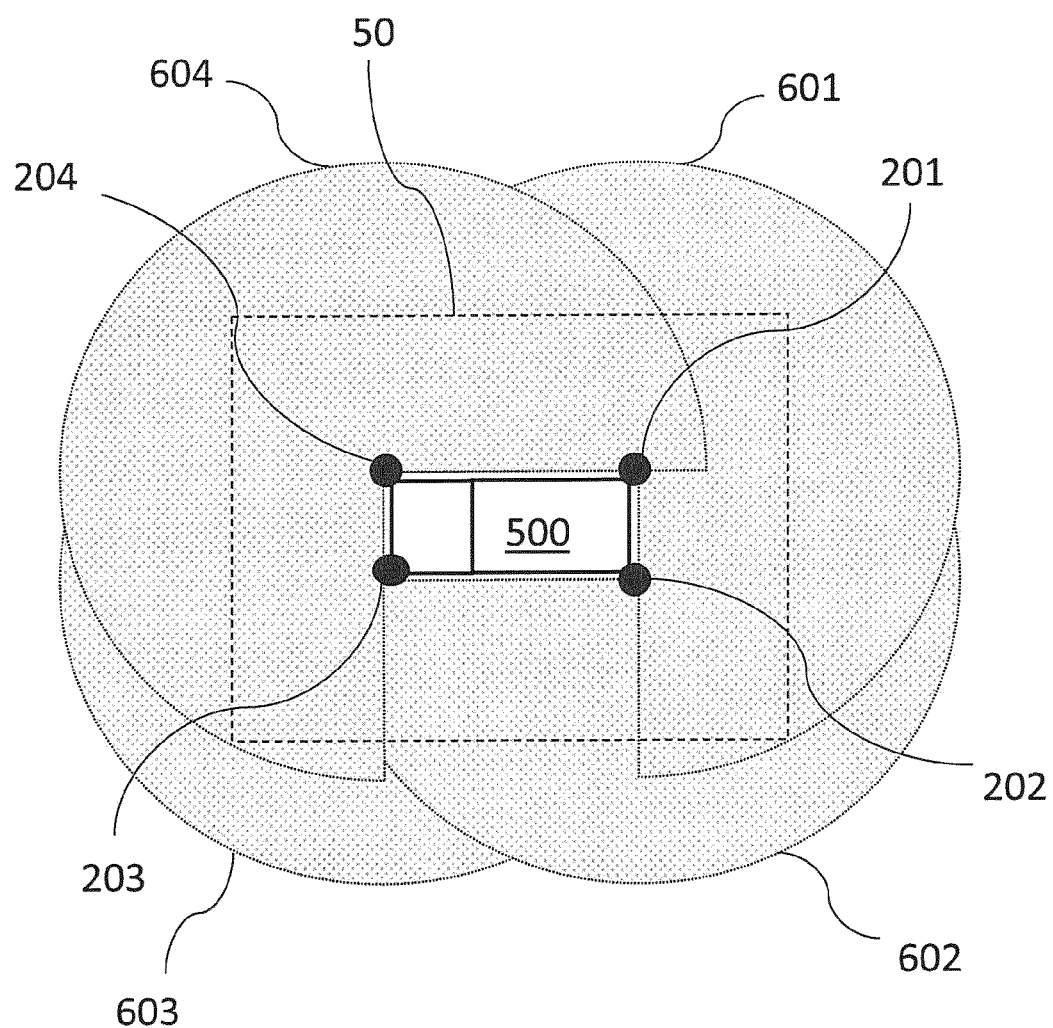
FIG. 5 shows a surround view system, where all cameras are available.

FIG. 5 depicts an embodiment for this dynamical replacement of lost camera views covering a surveillance area 50 around a vehicle 500. The vehicle 500 comprises four cameras 201 . . . 204 at four corners, i.e. the vehicle 500 comprises a first corner with a first camera 201, a second corner with a second camera 202, a third corner with a third camera 203, and a fourth corner with a fourth camera 204. The first camera 201 covers a first scene 601, the second camera 202 covers a second scene 602, the third camera 203 covers a third scene 603 and the fourth camera 204 covers a fourth scene 604.

Since the cameras 201, . . . , 204 are mounted at or close to the corners of the vehicle 500, each of the four scenes 601, . . . , 604 within the surveillance area 50 overlaps with another scene along a side of the vehicle 500. For example, the first and second cameras 201, 202 are mounted at the rear corners of the vehicle 500 so that the first scene 601 overlaps with the second scene 602 along the complete rear side of the vehicle 500 (right-hand side in FIG. 5). Similarly, the second scene 602 overlaps with the third scene 603 along the left-hand side of the vehicle 500 (it is assumed that the vehicle 500 moves forward from the right to the left).

Figure 6:
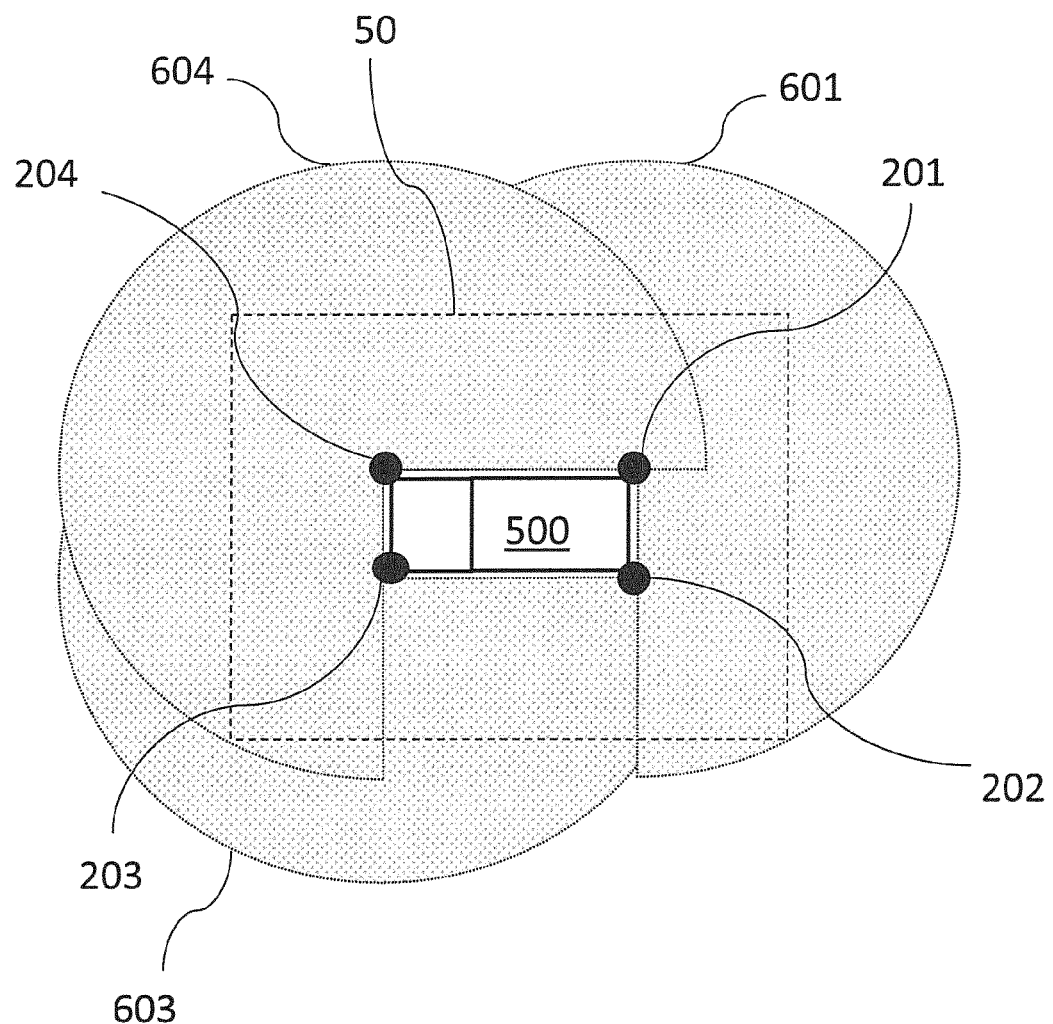
FIG. 6 shows a surround view system, where one camera is lost and replaced by the remaining cameras according to further embodiments.

FIG. 6 depicts the same setup as shown in FIG. 5. However, in FIG. 6 the second camera 202 shows a malfunction and does not produce an image or the image is incorrect (e.g. if the orientation of the camera has changed). This situation may be indicated by the feedback information given to the control module 220. Therefore, the second scene 202 is no longer covered by the second image. However, since the rear side of the vehicle 500 is part of the first scene 601 covered by the first camera 401 and since the left side of the vehicle 500 is part of the third scene 603 covered by the third camera 403, a complete coverage of the surveillance area 50 of the vehicle 500 is still available and the missing image data for the surveillance area 50 of the second camera 202 can be replaced by the image data provided by the first camera 201 and the third camera 203. Therefore, if one of the four cameras 201, . . . , 204 drops out, the two adjacent cameras (e.g. the first camera 201 and the third camera 203 in FIG. 6) can still be used to generate a surround view of the whole surveillance area 50.

The same applies if, for example, the fourth camera 204 fails, in which case the first camera 201 and the third camera 203 can take over to cover also the fourth scene 604 in the surveillance area 50.

Therefore, when placing the cameras at the corners or close to the corners of the vehicle 500, a double-coverage of each side of the vehicle is available so that this redundancy enables the replacement of any of the four cameras by the remaining cameras. Of course, outside the surveillance area 50 there may still be portions that are not double-covered and cannot be replaced, but by placing the cameras accordingly at least the surveillance area 50 can be covered by the remaining cameras.

Figure 7:
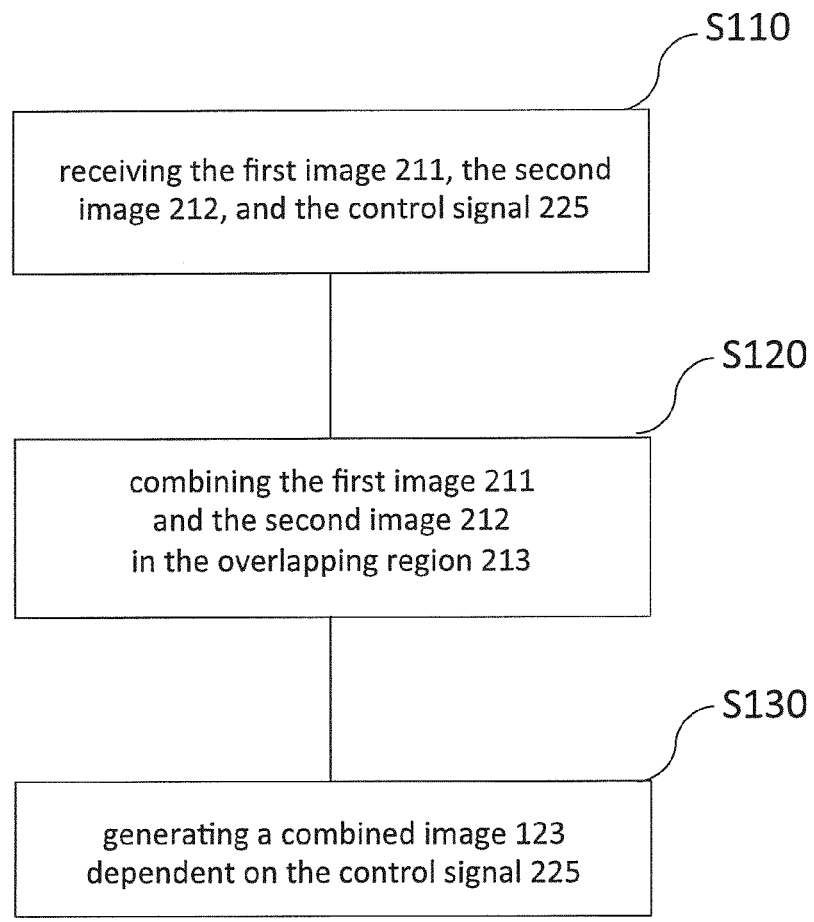
FIG. 7 shows a flow chart illustrating a method for image synthesizing according to embodiments of the present invention.

FIG. 7 depicts a flowchart for a method for synthesizing an image for a surround monitoring system or any other display device for the vehicle 500. The surround monitoring system (or other display device) comprises a first camera 201, a second camera 202 and a control module 220, wherein the first camera 201 is configured to capture a first image 210 from a first scene 601, the second camera 202 is configured to capture a second image 212 from a second scene 602, and the control module 220 is configured to generate a control signal 225 indicating a condition external to the vehicle 500 or feedback information (e.g. a defect camera). The first scene 601 and the second scene 602 partly overlap in an overlapping region 213 of a surveillance area 50 around the vehicle 500. The method comprises the steps of receiving S110 the first image 211, the second image 212, and the control signal 225; combining S120 the first image 211 and the second image 212 in the overlapping region 213; and generating S130 a combined image 123 dependent on the control signal 225.

This method may also be a computer-implemented method, a person of skill in the art would readily recognize that steps of the above-described method may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described methods, when executed on the a computer or processor.

Advantageous aspects of the various embodiments can be summarized as follows:

The present invention relies on the basic idea that the stitching line 250 or blending area can be placed anywhere, where the two images overlap. If the blending area is smaller (narrower) than the overlapping area 213 a narrow blending area can be moved inside the overlapping area 213. The purpose of moving the blending area is to avoid that the stitching line 250 crosses an object 400. However, this may not be possible in any situation. For example, when the view of the object is larger than the overlapping area, there is no way of moving the stitching line that it will not cross the object. However, in this situation the visibility is still good enough as the object is large.

According to embodiments of the present invention, the image synthesizing is done by combining two or more images into a synthesized (combined) image 123. For example, camera views in automotive applications can be merged together with this method to extend the FOV (field of view) of one camera. It may also be possible to add a perspective transformation to the camera views, before the views are merged and combined into a combined image. One example relates to the surround view application that provides a so-called bird's eye view or top view of the vehicle.

Embodiments do not only relate to such applications. Any automotive solution that uses images synthesizing can be improved using embodiments of the present invention. Such applications may, for example, include a replacement of a mirror by a display.

Two basic applications were described.

FIGS. 2 and 3 described the process of synthesizing images based on views seen by each camera 201, 202 projected to a respective plane, 211*p* and 212*p*. The cameras 201, 202 partly see the same area implying that there is an overlap in the field of view. These planes can be superposed or combined in that views of both cameras will overlap while only one projection of the object 400 stays visible by placing the stitching line accordingly.

FIG. 5 showed another situation where four cameras are available and the field of view of the cameras cover the surveillance area 50 (e.g. as displayed by an exemplary surround view system). On the other hand, FIG. 6 showed the situation when the rear left camera (shown at the bottom right) is lost. However, although the view of the lost camera is missing, the surround view display area 50 is still covered by the field of view of the adjacent cameras 201 and 203.

Embodiments of the present invention relate, in particular, to a vehicle surroundings monitoring apparatus comprising: two or more cameras 201, 202, . . . , and an image synthesizer transforming the view of the cameras 201, 202, . . . installed on the vehicle 500 into a combined view 123, which is characterized in that the image synthesizer synthesizes the combined image modified dynamically based on external conditions.

Further embodiments relate to a vehicle surroundings monitoring apparatus, wherein the parameters of synthesizing the camera views are dynamically updated based on the position of the objects in the views.

Further embodiments relate to a vehicle surroundings monitoring apparatus, wherein a blending mask is used which depends on at least one of the following parameters: a driving condition, an environmental condition of the vehicle and further input.

Further embodiments relate to a vehicle surroundings monitoring apparatus, wherein the system can dynamically replace a camera view, when its view is not available by the views of adjacent camera views.

Hence, embodiments of the present invention provide a surround view system, which generates the bird's eye view dynamically based on different conditions as, for example, 3D object positions around the vehicle.

The present invention provides the following advantages. The visibility of the surrounding objects in a bird's eye view by the surround view system is improved. In addition, the visibility of 3D objects in a seamless surround view is not limited in the stitched area, because the image synthesizing may not fade out the view of the 3D object. Dependent on the driving conditions, the environmental conditions of the vehicle and further input like the position of the 3D objects around the image synthesizer can provide a feedback for the image synthesizer to adapt the step of combining of images. Hence, dynamical changing of the image synthesizing improves the view of the vehicle surroundings.

Moreover, the dynamic update of the bird's eye view (the result of the image synthesizing) is beneficial and can be carried out at least in the following situations:

the stitching area crosses a three-dimensional object, in which case the stitching area can be moved to an area where no 3D object is present, the 3D object disappears due to the different projections in the views and the blending of these views, in which case the stitching area can be moved to make the 3D object visible from at least one of the views (camera position), and the view of at least one camera is lost (for example, a camera connection is lost or a camera is damaged or the field of view of the camera has been critically changed), in which case the stitching can be extended to show most parts of the surrounding area from at least one of the still working cameras (that means, for example, to cover as much as possible from the view of the lost camera by the remaining cameras).

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

The List of Reference Signs is as follows:

50 surveillance area
100 image synthesizer
110 receiving module
120 combining module
123 combined image
123*a* first region in combined image
123*b* second region in combined image
201, 202, . . . first camera, second camera, . . .

211 first scene
212 second scene
211e lower edge of first image
212e upper edge of second image
211p first image plane
212p second image plane
213 overlapping region
220 control module
225 control signal
250 stitching line
270 offset
400 object
500 vehicle
601, 602, . . . first scene, second scene, . . .
401p first projection
402p second projection
411p first moved projection
412p second moved projection

The invention claimed is:

1. An image synthesizer for a surround monitoring or display system for a vehicle, comprising:
a receiving module for receiving a first image, a second image, and a control signal, wherein the surround monitoring system includes a first camera, a second camera, and a control module, the first camera being configured to capture the first image from a first scene, the second camera being configured to capture the second image from a second scene, the control module being configured to generate the control signal indicating a condition external to the vehicle or feedback information, wherein the first scene and the second scene partly overlap in an overlapping region of a surveillance area of the vehicle; and
a combining module for combining the first image and the second image in the overlapping region, and, depending on the control signal, to generate a combined image;
wherein, when a 3D object is present in the overlapping region, the control signal indicates a position of the 3D object in the overlapping region, and wherein the combining module is configured to combine the first image and the second image by: (i) stitching the first image and the second image along a stitching line in an area of the overlapping region without crossing the position of the 3D object, and (ii) blending the first image and the second image in a blending region being part of the overlapping region such that the position of the 3D object is outside the blending region,
wherein the stitching line is moveable freely in the overlapping area of the two camera views so that the combining module dynamically updates or adjusts the combined image based on positions or movements of the 3D object, so that the stitching line is moved to an area where the 3D object is not present,
wherein the stitching line can be placed at any position, where no 3D object is visible while cutting off one of a plurality of projections of the 3D object, either in the first image or in the second image,
wherein the combining module is configured to perform the blending dependent on a condition external to the vehicle or the feedback information,
wherein the condition external to the vehicle includes a driving condition and at least one of the following: a defective camera, an environmental condition of the vehicle, and/or further input, and wherein the combining module is configured to select a characteristic of the blending based on the condition external to the vehicle or the feedback information, and
wherein the characteristic of the blending includes at least one of a blending width and a granularity of the blending.

2. The image synthesizer of claim 1, wherein, when the 3D object is present in the overlapping region, the control signal indicates the position of the 3D object in the overlapping region, and wherein the combining module is configured to combine the first image and the second image by stitching the first image and the second image along the stitching line in the area of the overlapping region without crossing the position of the 3D object.

3. The image synthesizer of claim 1, wherein, when the 3D object is present in the overlapping region, the control signal indicates the position of the 3D object in the overlapping region, and wherein the combining module is configured to combine the first image and the second image by blending the first image and the second image in the blending region being part of the overlapping region such that the position of the 3D object is outside the blending region.

4. The image synthesizer of claim 2, wherein the combining module is configured to determine a middle line of the overlapping region and place the stitching line at the middle line or to place the blending region to include the middle line.

5. The image synthesizer of claim 3, wherein the combining module is configured to perform the blending as a gradient blending and/or as a binary blending.

6. The image synthesizer of claim 1, wherein the receiving module is configured to receive an error signal as feedback information indicating a malfunction of the first camera or of the second camera, and wherein the combining module is configured to generate the combined image by ignoring image data from the malfunctioned camera.

7. The image synthesizer of claim 2, wherein the 3D object is one of a plurality of objects present in the overlapping region, and wherein the combining module is configured to place the stitching line at a distant object, the distant object being further away from the vehicle than other objects from the plurality of objects.

8. The image synthesizer of claim 1, wherein the combining module is configured to perform a perspective transformation of the first image and/or the second image before combining the first image and the second image, or to perform a perspective transformation of the combined image, and to provide it for display to a driver of the vehicle.

9. A surround monitoring system for monitoring a surveillance area of a vehicle, comprising:
at least a first camera and a second camera;
a control module to generate a control signal indicating a condition external to the vehicle or feedback information; and
an image synthesizer for a surround monitoring or display system for a vehicle, including:
a receiving module for receiving a first image, a second image, and a control signal, wherein the surround monitoring system includes a first camera, a second camera, and a control module, the first camera being configured to capture the first image from a first scene, the second camera being configured to capture the second image from a second scene, the control module being configured to generate the control signal indicating a condition external to the vehicle or feedback information, wherein the first scene and the second scene partly overlap in an overlapping region of a surveillance area of the vehicle; and a combining module for combining the first image and the second image in the overlapping region, and, depending on the control signal, to generate a combined image;

wherein, when a 3D object is present in the overlapping region, the control signal indicates a position of the 3D object in the overlapping region, and wherein the combining module is configured to combine the first image and the second image by: (i) stitching the first image and the second image along a stitching line in an area of the overlapping region without crossing the position of the 3D object, and (ii) blending the first image and the second image in a blending region being part of the overlapping region such that the position of the 3D object is outside the blending region, wherein the stitching line is moveable freely in the overlapping area of the two camera views so that the combining module dynamically updates or adjusts the combined image based on positions or movements of the 3D object, so that the stitching line is moved to an area where the 3D object is not present, and wherein the stitching line can be placed at any position, where no 3D object is visible while cutting off one of a plurality of projections of the 3D object, either in the first image or in the second image, wherein the combining module is configured to perform the blending dependent on a condition external to the vehicle or the feedback information, wherein the condition external to the vehicle includes a driving condition and at least one of the following: a defective camera, an environmental condition of the vehicle, and/or further input, and wherein the combining module is configured to select a characteristic of the blending based on the condition external to the vehicle or the feedback information, and wherein the characteristic of the blending includes at least one of a blending width and a granularity of the blending.

10. The surround monitoring system of claim 9, wherein:
the at least first camera and the second camera include four cameras for capturing four images, wherein the four cameras are attachable at four corners of the vehicle so that each part of the surveillance area is covered by two images of the four images,
the control module is configured to issue an error signal in case of a malfunction of one of the four cameras, and
the combining module is configured to generate a combined image by ignoring image data of the one malfunctioned camera and to take in the corresponding overlapping region only image data of cameras adjacent to the one malfunctioned camera.

11. A vehicle, comprising:
a surround monitoring system for monitoring a surveillance area of the vehicle, including:
at least a first camera and a second camera;
a control module to generate a control signal indicating a condition external to the vehicle or feedback information; and
an image synthesizer for a surround monitoring or display system for a vehicle, including:
a receiving module for receiving a first image, a second image, and a control signal, wherein the surround monitoring system includes a first camera, a second camera, and a control module, the first camera being configured to capture the first image from a first scene, the second camera being configured to capture the second image from a second scene, the control module being configured to generate the control signal indicating a condition external to the vehicle or feedback information, wherein the first scene and the second scene partly overlap in an overlapping region of a surveillance area of the vehicle; and
a combining module for combining the first image and the second image in the overlapping region, and, depending on the control signal, to generate a combined image;
wherein, when a 3D object is present in the overlapping region, the control signal indicates a position of the 3D object in the overlapping region, and wherein the combining module is configured to combine the first image and the second image by: (i) stitching the first image and the second image along a stitching line in an area of the overlapping region without crossing the position of the 3D object, and (ii) blending the first image and the second image in a blending region being part of the overlapping region such that the position of the 3D object is outside the blending region,
wherein the stitching line is moveable freely in the overlapping area of the two camera views so that the combining module dynamically updates or adjusts the combined image based on positions or movements of the 3D object, so that the stitching line is moved to an area where the 3D object is not present, and
wherein the stitching line can be placed at any position, where no 3D object is visible while cutting off one of a plurality of projections of the 3D object, either in the first image or in the second image,
wherein the combining module is configured to perform the blending dependent on a condition external to the vehicle or the feedback information,
wherein the condition external to the vehicle includes a driving condition and at least one of the following: a defective camera, an environmental condition of the vehicle, and/or further input, and wherein the combining module is configured to select a characteristic of the blending based on the condition external to the vehicle or the feedback information, and
wherein the characteristic of the blending includes at least one of a blending width and a granularity of the blending.

12. A method for synthesizing an image for a surround monitoring or display system of a vehicle, the method comprising:
receiving a first image, a second image, and a control signal, wherein the surround monitoring system includes a first camera, a second camera, and a control module, the first camera being configured to capture the first image from a first scene, the second camera being configured to capture the second image from a second scene, the control module being configured to generate the control signal indicating a condition external to the vehicle or feedback information, wherein the first scene and the second scene partly overlap in an overlapping region of a surveillance area of the vehicle;
combining the first image and the second image in the overlapping region; and
generating a combined image dependent on the control signal;
wherein, when a 3D object is present in the overlapping region, the control signal indicates a position of the 3D object in the overlapping region, and wherein the combining module is configured to combine the first image and the second image by: (i) stitching the first image and the second image along a stitching line in an area of the overlapping region without crossing the position of the 3D object, and (ii) blending the first image and the second image in a blending region being part of the overlapping region such that the position of the 3D object is outside the blending region, wherein the stitching line is moveable freely in the overlapping area of the two camera views so that the combining module dynamically updates or adjusts the combined image based on positions or movements of the 3D object, so that the stitching line is moved to an area where the 3D object is not present, and wherein the stitching line can be placed at any position, where no 3D object is visible while cutting off one of a plurality of projections of the 3D object, either in the first image or in the second image, wherein the combining module is configured to perform the blending dependent on a condition external to the vehicle or the feedback information, wherein the condition external to the vehicle includes a driving condition and at least one of the following: a defective camera, an environmental condition of the vehicle, and/or further input, and wherein the combining module is configured to select a characteristic of the blending based on the condition external to the vehicle or the feedback information, and wherein the characteristic of the blending includes at least one of a blending width and a granularity of the blending.

13. A non-transitory computer readable medium having a computer program, which is executable by a processor, comprising:

a program code arrangement having program code for synthesizing an image for a surround monitoring or display system of a vehicle, by performing the following:

receiving a first image, a second image, and a control signal, wherein the surround monitoring system includes a first camera, a second camera, and a control module, the first camera being configured to capture the first image from a first scene, the second camera being configured to capture the second image from a second scene, the control module being configured to generate the control signal indicating a condition external to the vehicle or feedback information, wherein the first scene and the second scene partly overlap in an overlapping region of a surveillance area of the vehicle;

combining the first image and the second image in the overlapping region; and generating a combined image dependent on the control signal;

wherein, when a 3D object is present in the overlapping region, the control signal indicates a position of the 3D object in the overlapping region, and wherein the combining module is configured to combine the first image and the second image by: (i) stitching the first image and the second image along a stitching line in an area of the overlapping region without crossing the position of the 3D object, and (ii) blending the first image and the second image in a blending region being part of the overlapping region such that the position of the 3D object is outside the blending region, wherein the stitching line is moveable freely in the overlapping area of the two camera views so that the combining module dynamically updates or adjusts the combined image based on positions or movements of the 3D object, so that the stitching line is moved to an area where the 3D object is not present, and wherein the stitching line can be placed at any position, where no 3D object is visible while cutting off one of a plurality of projections of the 3D object, either in the first image or in the second image, wherein the combining module is configured to perform the blending dependent on a condition external to the vehicle or the feedback information, wherein the condition external to the vehicle includes a driving condition and at least one of the following: a defective camera, an environmental condition of the vehicle, and/or further input, and wherein the combining module is configured to select a characteristic of the blending based on the condition external to the vehicle or the feedback information, and wherein the characteristic of the blending includes at least one of a blending width and a granularity of the blending.

* * * * *